Aug. 13, 1963  J. MEEKER ETAL  3,100,712
PROCESS AND APPARATUS FOR MAKING AND SHIPPING CHEESE
Filed March 20, 1962  4 Sheets-Sheet 1

Jess Meeker
William H. Tate
INVENTORS

BY *Clarence A. O'Brien
and Harvey B. Jacobson*
Attorneys

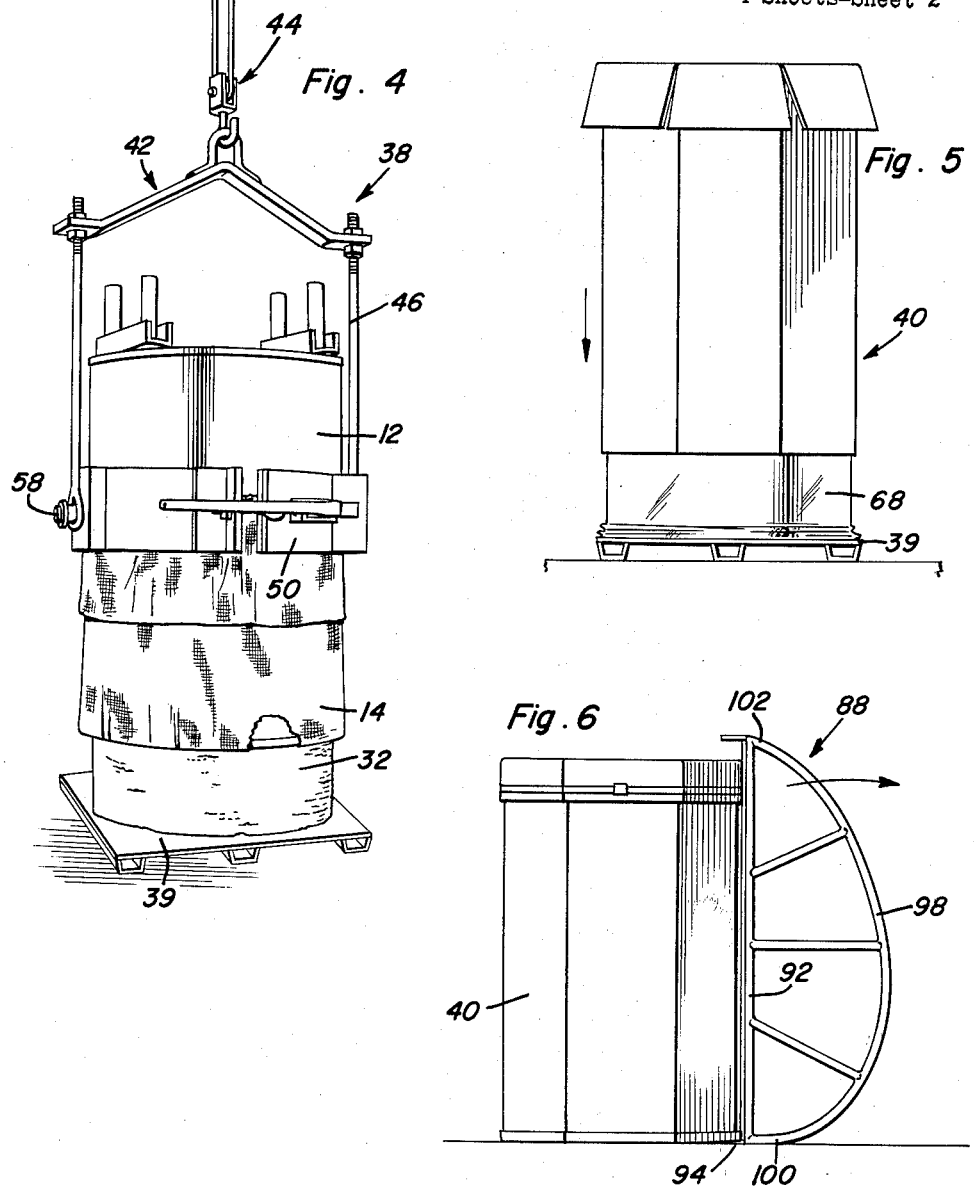

Aug. 13, 1963   J. MEEKER ETAL   3,100,712
PROCESS AND APPARATUS FOR MAKING AND SHIPPING CHEESE
Filed March 20, 1962   4 Sheets-Sheet 3
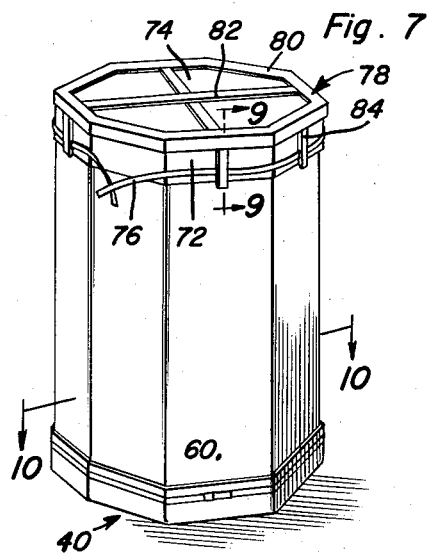
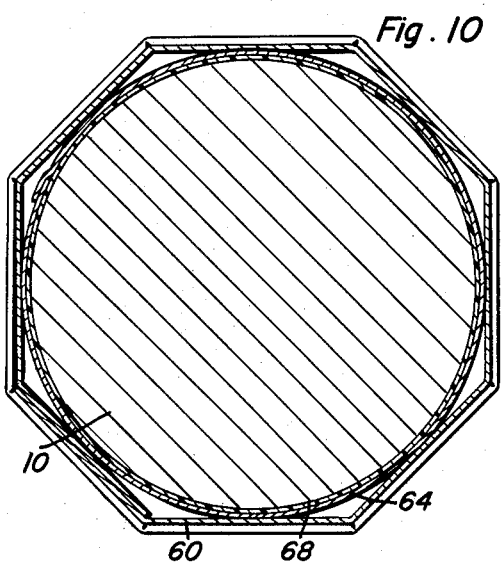
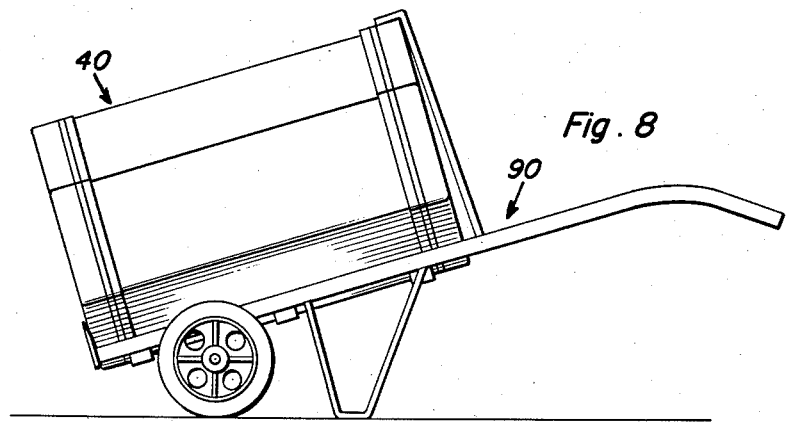
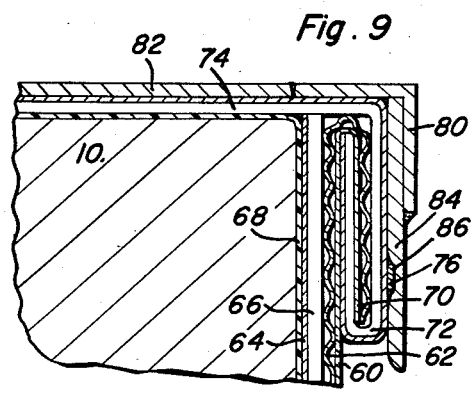
Jess Meeker
William H. Tate
INVENTORS Aug. 13, 1963    J. MEEKER ETAL    3,100,712
PROCESS AND APPARATUS FOR MAKING AND SHIPPING CHEESE
Filed March 20, 1962    4 Sheets-Sheet 4

Jess Meeker
William H. Tate
INVENTORS

BY
Attorneys

United States Patent Office 3,100,712
Patented Aug. 13, 1963

3,100,712
PROCESS AND APPARATUS FOR MAKING AND SHIPPING CHEESE
Jess Meeker and William H. Tate, Clinton, Mo., assignors to Clearfield Cheese Company, Inc., Clinton, Mo., a corporation of Pennsylvania
Filed Mar. 20, 1962, Ser. No. 181,119
15 Claims. (Cl. 99—178)

This invention relates to a novel method and associated apparatus for handling bulk quantities of cheese.

The present invention is concerned with the shipping of bulk quantities of cheese and accordingly involves the preparation and packaging of such bulk quantities for shipping purposes. In addition to the usual shipping problems, the shipment of cheese requires removal of moisture therefrom prior to sealing within the shipping container so as to avoid an undesirable accumulation of cheese mold on the surfaces of the cheese. Thus, the usual method for preparing bulk cheese for shipment, involves pouring the cheese into a metallic barrel having the lid loosely installed thereon so that the barrel may be inverted at specified intervals of time permitting the water to run out of the cheese at either end of the barrel. After the water has been so drained from the cheese within the barrels, the lids are then securely sealed. The procedure heretofore utilized involves several different disadvantages including for example, the incomplete drainage of moisture from the molded cheese, the development of surface irregularities in the molded cheese which promote surface cheese mold and finally said procedure involves the use of metallic barrels which present difficult handling problems in view of their bulk and weight. A primary object of the present invention therefore, is to provide a novel method for handling bulk cheese which avoids the aforementioned disadvantages.

Another object of the present invention is to provide a novel method for handling bulk cheese which involves molding of the cheese into an externally smooth surfaced form with the moisture more completely drained therefrom so as to more effectively avoid the accumulation of surface mold on the cheese during shipment.

An additional object of the present invention is to provide a novel method wherein cheese is initially molded in accordance with the foregoing objects and then directly deposited in a foldable type of shipping container of a reduced weight so as to overcome the aforementioned container handling problem.

A further object of the present invention is to provide a novel shipping container for bulk cheese in accordance with the foregoing objects.

A still further object of the present invention is to provide apparatus for sealing the novel shipping container as part of the handling method of the present invention.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view illustrating a following step of the method of the present invention wherein the molded cheese is removed from the molding.

FIGURE 5 is a perspective view of the shipping container in the process of receiving plastic encased cheese.

FIGURE 6 is a front elevational view of the shipping container and associated displacing apparatus utilized to complete the container sealing steps.

FIGURE 7 is a perspective view of the shipping container nearing completion of the sealing step.

FIGURE 8 is a side elevational view of the completed and bulk loaded shipping container in transport position.

FIGURE 9 is an enlarged partial sectional view taken substantially through a plane indicated by section line 9—9 of FIGURE 7.

FIGURE 10 is a transverse sectional view taken substantially through a plane indicated by section line 10—10 in FIGURE 7.

Figure 1:
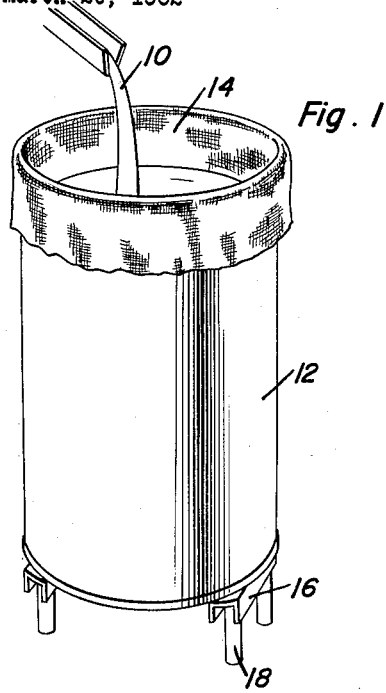
FIGURE 1 is a perspective view illustrating of a first stage in the cheese molding process pursuant to the principles of the present invention.
Figure 3:
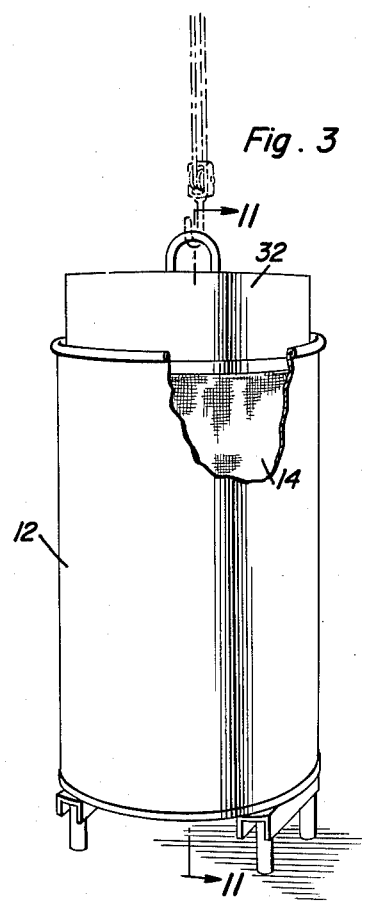
FIGURES 2 and 3 are perspective views illustrating subsequent steps in the molding process.
Figure 2:
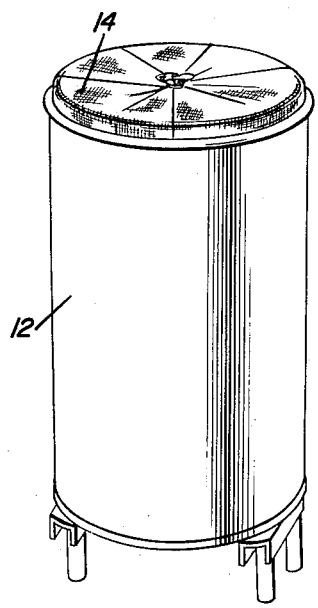
Figure 11:
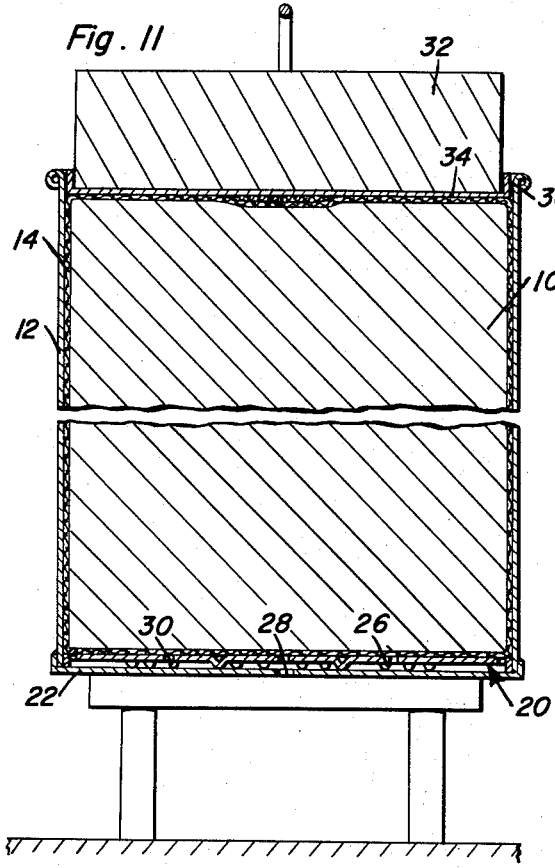
FIGURE 11 is a partial sectional view taken substantially through a plane indicated by section line 11—11 in FIGURE 3.
Figure 12:
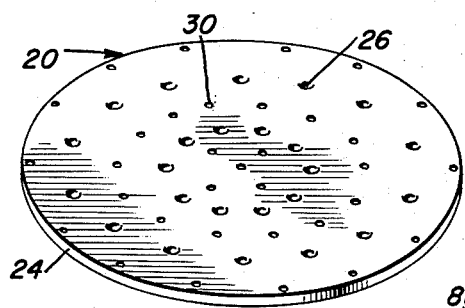
FIGURE 12 is a perspective view of the mold draining plate.

Referring now to the drawings in detail, it will be observed in FIGURE 1, that the initial step of the method of the present invention involves the pouring of fresh cheese curd 10 into a metallic cheese mold cylinder 12 within which a cheese-cloth bag 14 is fitted and overlaps the open top end of the metallic cylinder 12. The mold cylinder 12 is accordingly supported in vertical position by members 16 connected to spaced legs 18. After the fresh cheese curd is poured into the mold cylinder 12, the cloth bag 14 is closed as illustrated in FIGURE 2. Referring now to FIGURES 3, 11 and 12, it will be observed that a drain plate 20 is placed in the bottom of the mold cylinder 12 in spaced relation above the bottom member 22 thereof, said spacing being maintained by a rim portion 24 on the drain plate 20 and downwardly projecting nipples 26. Located centrally of the bottom member 22 of the cylinder 12, is a drain opening 28 through which cheese whey is drained. Accordingly, the drain plate 20 is provided with a plurality of draining apertures 30 through which moisture from the cheese 10 is forced out. Thus, after the cheese 10 is poured into the mold cylinder 12 encased within the cloth bag 14, pressure is applied thereto so as to reduce its volume and thereby force the moisture therefrom through the draining apertures 30 in the drain plate 20. Pressure is applied to the cheese 10 by means of the placement of a massive weight 32 on top of the cheese 10 through the open top of the mold cylinder 12. However, in order to assure that the pressure is applied uniformly and to prevent development of surface irregularities in the molded cheese 10, a pressure plate 34 is provided which fits within the open top of the cylinder 12 and has an upwardly extending annular rim 36 for receiving the weight 32. The weight 32 is therefore permitted to remain on top of the cheese for a period of at least ten hours during which time moisture will drain through the apertures 30 in the drain plate 20 and the drain hole 28 in the bottom 22 of the mold cylinder.

Figure 14:
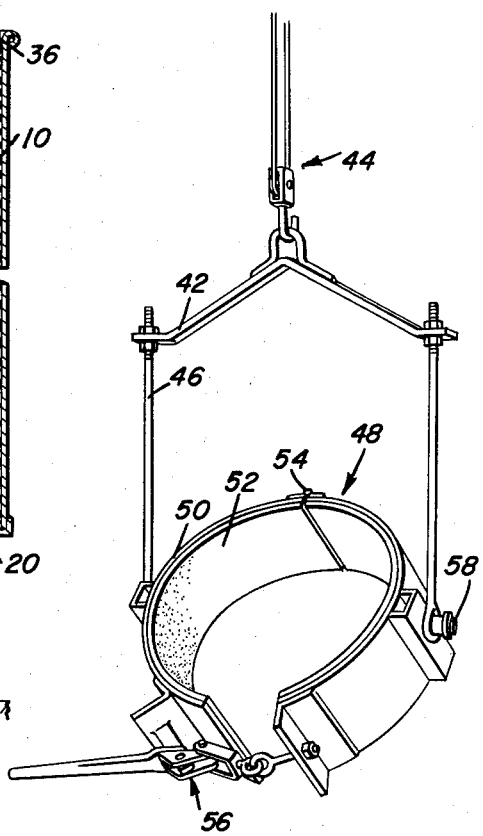
FIGURE 14 is a perspective view of the mold inverting mechanism.

Referring now to FIGURE 4 in particular, it will be observed that after the molding process has been completed as described with respect to FIGURES 1, 2 and 3, a mold inverting mechanism generally referred to by reference numeral 38 is applied to the mold cylinder 12 after the cloth bag 14 has been opened so that the compressed and dry cheese may be directly deposited onto a stainless steel plate 39. The mold inverting mechanism 38 as more clearly seen from FIGURES 4 and 14, includes a suspension yoke 42 suspended by any suitable overhead block and tackle mechanism 44. Adjustably connected to the suspension yoke 42 are a pair of suspension rods 46 to which a pressure clamp mechanism 48 is pivotally connected. The clamp mechanism 48 therefore includes a pair of pivotally interconnected metal bands 50 internally lined with neoprene rubber 52 for clamping engagement with the mold cylinder 12. The bands are therefore interconnected by the hinge 54 and locked in clamp position about the mold cylinder 12 by means of a pressure locking mechanism 56. Each of the bands 50 also includes aligned pivot assemblies 58 by means of which they are pivotally connected to the lower ends of the suspension rods 46. Accordingly, after the prolonged pressure molding period, the clamp bands 50 are lowered about the cylindrical mold 12 and locked thereto by the pressure locking mechanism 56 so that the cylinder 12 may then be rotated about the pivot assemblies 58 by 180° directly above the shipping container 40 as indicated in FIGURE 4.

Referring now to FIGURES 7, 9 and 10, in particular, it will be observed that the shipping container 40 includes an outer tubular casing 60 made of fiber-type cardboard having exposed on one side thereof, a corrugated reinforcement 62. The outer casing 60 is polygonal in cross-sectional shape and in the illustrated example forms an octagon. In view of the flat sided cross-sectional shape of the outer casing 60, it may be folded for more convenient storing and also will provide a more rigid closure. Furthermore, since the outer casing is made of cardboard, its weight will be no problem at all. Disposed within the confines of the outer tubular casing 60, is an inner cylindrical casing 64 made of the same fiber-type cardboard having vertically disposed reinforcing corrugations 66. Thus, the inner and outer casings although made of cardboard, by virtue of the corrugations thereof form a container having the requisite strength and forming an interior cylindrical surface for receiving the molded cheese after being encased within a plastic liner 68 that is air and moistureproof, as shown in FIGURE 5.

Each of the flat sides of the outer tubular casing 60 is provided with a flat extension 70 at each axial end which cooperates with a foldable flat extension 72 connected to a corrugation reinforced cardboard lid 74 provided for the purpose of sealing both axial ends of the container 40. The sealing flaps 72 from the lids 74 are accordingly folded downwardly and upwardly behind the flat extensions 70 of the outer tubular casing 60 as indicated in FIGURE 9. The assembly is then sealed or bound with a metallic strap or band 76. In order to install and tie the binding strap 76, a holder device generally referred to by reference numeral 78 is positioned above the lid 74. The holder device 78 includes therefore, a rim portion 80 formed of angle iron in a shape corresponding to the cross-sectional shape of the container 40 and associated lid 74. The rim 80 is maintained rigid by means of cross brace members 82. Also, secured to the rim portion 80 and projecting perpendicular thereto centrally of the flat sides of the container 40, are a plurality of strap holder projections 84. Each of the projections 84 is thus provided with a slot 86 for receiving the bands 76 therethrough to thereby hold the bands in fixed axial spaced relation to the rim portion 80 and also in encircling relation to the flaps 72 projecting in an axial direction from the lid 74. One of the sides of the container 40, however, does not have an associated band holding projection 84 so that the ends of the band 76 may be bound in a stretched condition in a manner well known to those skilled in the art. Accordingly, each axial end of the container 40 has a lid assembly thereon and bound by a band in the same manner.

The container 40 after receiving the molded cheese as indicated in FIGURE 5 may then be sealed at one end as hereinbefore described. The container 40 must thereafter be displaced so as to expose the other end for sealing purposes in the same manner. Accordingly, the container displacing device generally referred to by reference numeral 88 is applied to one flat side of the container 40 as indicated in FIGURE 6 for such purpose. The device 88 is designed for facilitated displacement of the container 40 by 180° whereupon sealing of the container may be completed as indicated in FIGURE 7. Thereafter, the loaded and completely sealed container 40 may be loaded on a specially balanced hand truck 90 for transport purposes as indicated in FIGURE 8.

Figure 13:
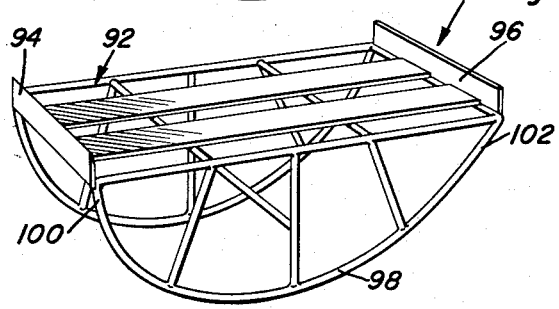
FIGURE 13 is a perspective view of the loaded container displacing device illustrated in FIGURE 6.

Referring now to FIGURES 6 and 13, it will be observed that the container displacing device 88 include an elongated frame portion 92 which fits up against a flat side of the container 40. One end of the flat frame 92 has connected thereto a lifting member 94 for engaging the unsealed bottom of the container 40 as indicated in FIGURE 6 in order to effect pivotal displacement thereof from the vertical position illustrated in FIGURE 6. The other end of the side frame 92 is provided with a retaining member 96 so as to confine the container 40 to the frame 92 when it is displaced beyond its horizontal position. Connected to the side frame 92 for engagement with the ground, are a pair of parallel runner assemblies 98 which are designed with a varying curvature so as to gradually displace the container 40 avoiding damage thereto. For this reason, the bottom end portion 100 of the runners 98 are provided with a minimum radius of curvatures which increases to a maximum value at the top end portion 102. Suitable bracing members are interconnected between the runners 98 and the side frame assembly 92. Accordingly, the container 40 sealed at one end may be conveniently displaced so as to expose the other axial end for sealing in the same manner.

From the foregoing description, the procedure involved and the novel method of the present invention and the use of the apparatus associated therewith will be apparent. It will therefore be appreciated that the fresh cheese curd may initially be formed into an externally smooth surfaced mold and pressurized by a weight to reduce the volume thereof and remove the moisture therefrom without developing any surface irregularities in the molded cheese. Accordingly, development of surface mold on the cheese will be avoided by a more complete removal of the moisture and avoidance of surface crevices. Thereafter, the molded cheese may be encased in plastic and enclosed within the cardboard type container constructed so as to have the requisite strength and moistureproofing yet having less weight and better storing attributes than shipping containers heretofore utilized. Also, the construction of the container is such as to render the parts thereof re-usable. Sealing of the container is also facilitated by use of the novel container displacing device so as to accomplish complete sealing of the container without damage thereto. Furthermore, by use of the band holder device, rapid and uniform sealing is accomplished.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of preparing and handling cheese for shipping purposes comprising the steps of: pouring fresh cheese curd into a cloth bag fitted within a rigid cylindrical mold; completely enclosing the cheese curd by said bag; applying continuous axial pressure to the bag and molded cheese in a stationary position between smooth flat surfaces for a prolonged period of time for reducing the volume of the molded cheese; draining cheese whey from the molded cheese while in said stationary position during said prolonged period of time for removal of moisture therefrom; inverting the cylindrical mold and opening said bag for removal of said molded cheese; encasing said cheese within an air and moistureproof plastic liner; enclosing said cheese and liner within a cardboard shipping box; and pivotally displacing said shipping box for sealing opposite ends immediately after receiving said molded cheese.

2. A method of handling cheese for bulk shipment purposes comprising the steps of: molding cheese curd into an externally smooth surfaced shape; reducing the volume of the molded cheese to remove moisture therefrom without development of any external surface irregularities; encasing said cheese within an air and moisture-proof plastic liner; enclosing said cheese and liner within a cardboard shipping box; and immediately sealing said container.

3. The method of claim 2 wherein said step of molding the cheese curd comprises pouring fresh cheese curd into a rigid cylindrical mold having an apertured bottom for draining and lined with a cloth bag overhanging an open top.

4. The method of claim 3, wherein said step of reducing the volume of the molded cheese comprises placing a smooth surfaced pressure plate over the top of the molded cheese through the open top of the cylindrical mold and placing a massive weight on the pressure plate for a prolonged period of time.

5. The method of claim 4 wherein, said container is sealed by placing lids on both axial ends of said container, and folding sealing flap extensions connected to the axial ends of the container and lids into mating engagement.

6. The method of claim 5, wherein said step of sealing the container includes placing a rigid lid rim over an exposed axial end of the container having a lid installed thereon, threading a sealing band strap through slots in axially extending projections from the lid rim and binding the band strap in stretched condition about sealing flap extensions of the lid folded about flap extensions of the container.

7. The method of claim 6 wherein said step of sealing the container further includes pivotally displacing said container from a vertical position after sealing one axial end thereof to expose the other axial end for sealing purposes.

8. The method of claim 2, wherein said step of reducing the volume of the molded cheese comprises placing a smooth surfaced pressure plate over the top of the molded cheese through the open top of the cylindrical mold and placing a massive weight on the pressure plate for a prolonged period of time.

9. The method of claim 2, wherein said step of sealing the container includes placing a rigid lid rim over an exposed axial end of the container having a lid installed thereon, threading a sealing band strap through slots in axially extending projections from the lid rim and binding the band strap in stretched condition about sealing flap extensions of the lid folded about flap extensions of the container.

10. The method of claim 9 wherein said step of sealing the container further includes pivotally displacing said container from a vertical position after sealing one axial end thereof to expose the other axial end for sealing purposes.

11. A shipping container for molded cheese bulk comprising, an outer tubular casing of polygonal cross-section, an inner cylindrical sleeve lined with a moisture-excluding material, lids for both axial ends of said outer tubular casing, and folded sealing flap extensions connected to the axial ends of the outer casing and lids.

12. The container of claim 11 wherein said outer casing and inner sleeve are made of fiber type cardboard respectively reinforced by corrugations disposed perpendicular to each other.

13. The container of claim 12 including flaps extending from opposite axial ends of the outer casing and lids having folded sealing flaps extending radially therefrom for folding about said casing flaps.

14. A band holder for binding straps associated with a container and lid comprising, a rigid rim of a polygonal configuration geometrically similar to the cross-sectional shape of said container, a plurality of circumferentially spaced projections connected to said rim and extending perpendicular therefrom and having slots formed therein for receiving a binding strap to hold said strap in axially spaced relation to the rim and in encircling relation to the lid.

15. A turner for pivotally displacing a loaded container by 180 degrees comprising, an elongated side frame for supporting a longitudinal side of the container, a lifting member connected to one end of said side frame and a retaining member connected to another end of said side frame, and parallel runner means connected to said side frame and having a varying curvature with a maximum radius at said one end of the side frame and a minimum radius at said other end.

References Cited in the file of this patent

UNITED STATES PATENTS

| | | |
|---|---|---|
| 214,381 | Freeman | Apr. 15, 1879 |
| 1,061,929 | Simon | May 13, 1913 |
| 1,625,130 | Meyers | Apr. 19, 1927 |